(12) United States Patent
Watanabe et al.

(10) Patent No.: US 7,866,746 B2
(45) Date of Patent: Jan. 11, 2011

(54) STRUCTURE OF ATTACHING MONITOR PANEL

(75) Inventors: Toyotaka Watanabe, Toyota (JP); Takayuki Niwa, Toyota (JP); Nobuhiko Kazui, Aichi-ken (JP); Masahiro Iwamoto, Toyota (JP); Satoshi Sugiyama, Toyota (JP); Kenji Obara, Okazaki (JP); Naoki Mitsuoka, Aichi-ken (JP); Hideyuki Yamanaka, Toyota (JP); Yuji Nishiyama, Toyota (JP)

(73) Assignee: Toyota Boshoku Kabushiki Kaisha, Kariya-Shi, Aichi-Ken (JP)

( * ) Notice: Subject to any disclaimer, the term of this patent is extended or adjusted under 35 U.S.C. 154(b) by 162 days.

(21) Appl. No.: 12/271,195

(22) Filed: Nov. 14, 2008

(65) Prior Publication Data

US 2009/0127897 A1 May 21, 2009

(30) Foreign Application Priority Data

Nov. 21, 2007 (JP) ............................. 2007-301621

(51) Int. Cl.
*A47C 31/00* (2006.01)
(52) U.S. Cl. ............................... 297/217.3; 297/188.04
(58) Field of Classification Search ............ 297/188.04, 297/217.3
See application file for complete search history.

(56) References Cited

U.S. PATENT DOCUMENTS 5,267,775 A * 12/1993 Nguyen .................. 297/217.3
5,295,732 A * 3/1994 Boisset ................... 297/452.1
5,507,556 A * 4/1996 Dixon ..................... 297/217.3
6,669,285 B1 * 12/2003 Park et al. ............... 297/217.3
6,739,654 B1 * 5/2004 Shen et al. ............. 297/188.04
6,883,870 B2 * 4/2005 Jost ............................. 297/391
7,040,697 B1 * 5/2006 Tuccinardi et al. ....... 297/217.3
7,188,895 B1 * 3/2007 Espina et al. ............ 297/217.3
7,354,091 B2 * 4/2008 Lavelle et al. ........... 296/37.15
7,364,230 B2 4/2008 Zheng
7,407,227 B1 * 8/2008 Tuccinardi et al. ....... 297/217.3
7,448,679 B2 * 11/2008 Chang ..................... 297/217.3
7,591,508 B2 * 9/2009 Chang ..................... 297/217.3
7,597,393 B1 * 10/2009 Tuccinardi et al. ....... 297/217.3
7,597,394 B2 * 10/2009 Liu ......................... 297/217.3
7,611,198 B2 * 11/2009 Schweizer ............... 297/217.3
2008/0165293 A1 7/2008 Tranchina

FOREIGN PATENT DOCUMENTS

DE 202004008205 U1 8/2004
JP 2001-047921 A 2/2001
WO 2004/054847 A1 7/2004

OTHER PUBLICATIONS

English language Abstract of JP 2001-047921 A.
English language Abstract of DE 202004008205 U1.

* cited by examiner

*Primary Examiner*—Laurie K Cranmer
(74) *Attorney, Agent, or Firm*—Greenblum & Bernstein, P.L.C.

(57) ABSTRACT

The present invention can include a frame member which attaches the monitor panel at a back side of a vehicle seat, a skin member covering the vehicle seat, a pad member having a seat outer shape, the frame member is harder than the pad member, and the frame member is arranged at a back side of the vehicle seat in place of the pad member and covered by the skin member and the monitor panel is attached to the frame member through the skin member.

13 Claims, 6 Drawing Sheets

STRUCTURE OF ATTACHING MONITOR PANEL

This application claims priority to Japanese patent application serial number 2007-301621, the contents of which are incorporated herein by reference.

BACKGROUND OF THE INVENTION

1. Field of the Invention

The present invention relates to an attaching structure for a monitor panel at a back side of a vehicle seat.

2. Description of the Related Art

A kind of attaching structure for a monitor panel, wherein a monitor panel is attached to a back side of a headrest by using a frame member is described in JP-A-2001-47921. The frame member includes a lower frame and an upper frame for squeezing a monitor panel in a shape of a flat plate. The upper panel substantially in a rectangular shape is provided with an outer shape dimension larger than that of the lower frame of the same shape.

The back side of the headrest includes a pad member and a skin member. The pad member is provided with a recess portion. The lower frame is inserted to the recess portion of the pad member, thereafter, the upper frame is integrated to the lower frame while being pressed thereto. Further, by squeezing the monitor panel by the upper frame and the lower frame (frame members), the monitor panel is fixed to the back side of the headrest.

However, in this configuration, when the pad member of the headrest is soft, the pad member can become crushed by pressing the upper frame. Therefore, according to this configuration, the appearance of the vehicle seat is deteriorated by wrinkling the skin member.

Incidentally, pressing of the upper frame can also be loosened. However, when the pressing of the upper frame is loosened, instead of wrinkling the skin member, the frame member shakes relative to the pad member, and therefore, the constitution is inconvenient.

SUMMARY OF THE INVENTION

The present invention can include a frame member which attaches the monitor panel at a back side of a vehicle seat, a skin member covering the vehicle seat, a pad member having a seat outer shape, the frame member is harder than the pad member, and the frame member is arranged at a back side of the vehicle seat in place of the pad member and covered by the skin member and the monitor panel is attached to the frame member through the skin member.

BRIEF DESCRIPTION OF THE DRAWINGS

FIG. 3 (*a*) is a perspective view of a back side of a vehicle seat arranged with a pad member;

FIG. 3 (*b*) is a perspective view of a back side of a vehicle seat expanded with a skin member;

DETAILED DESCRIPTION OF THE INVENTION

Each of the additional features and teachings disclosed above and below may be utilized separately or in conjunction with other features and teachings to provide the an attaching structure for a monitor panel. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given, referring FIGS. 1 to 6, of a best mode for carrying out of the invention.

Figure 1:
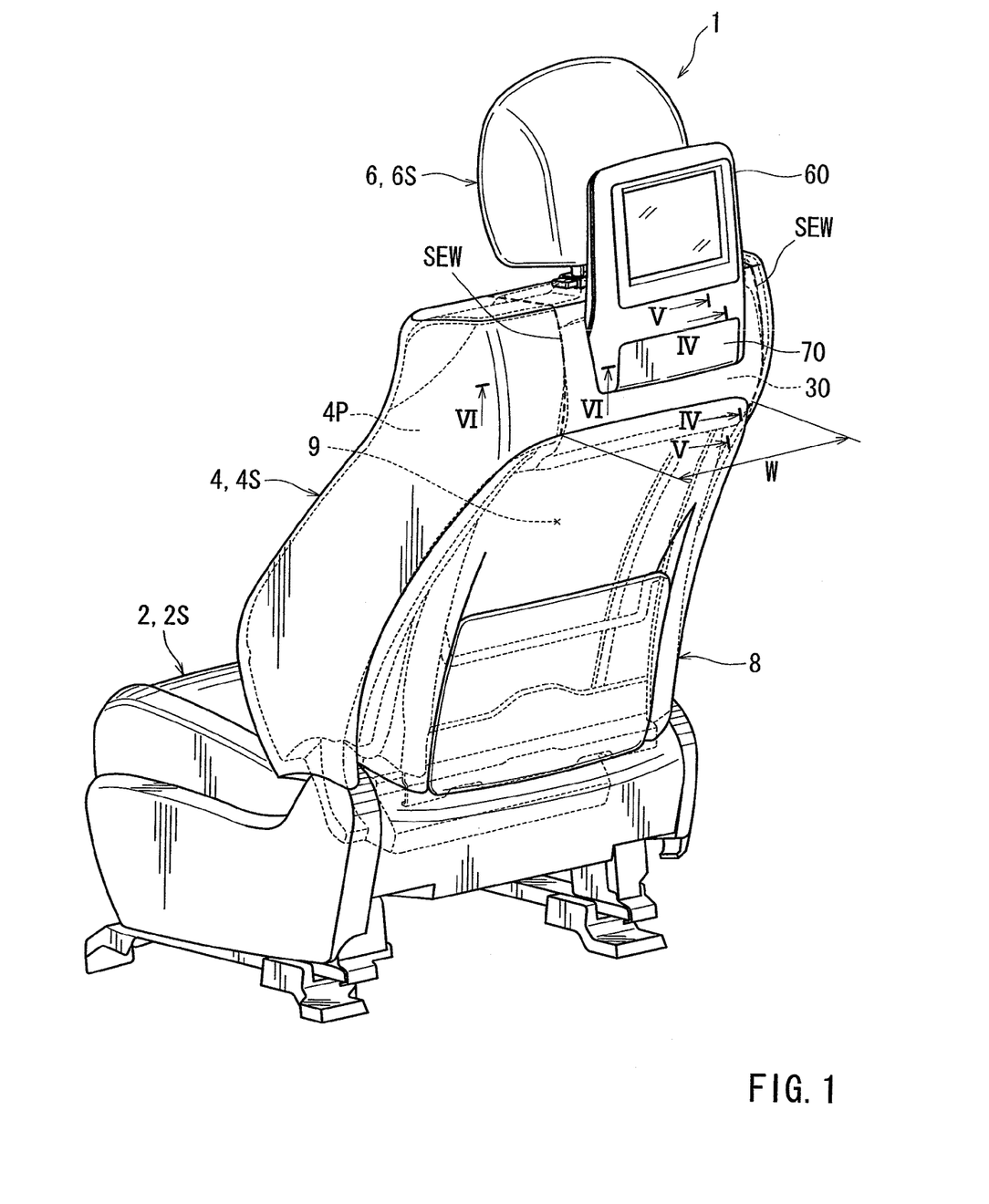
FIG. 1 is a perspective view of a back side of a vehicle seat.

In reference to FIG. 1, a vehicle seat 1 includes a seat cushion 2, a seat back 4 and a headrest 6. The vehicle seat 1 includes covering skin members (2S, 4S, 6S) on a pad member constituting an outer shape thereof.

Figure 2:
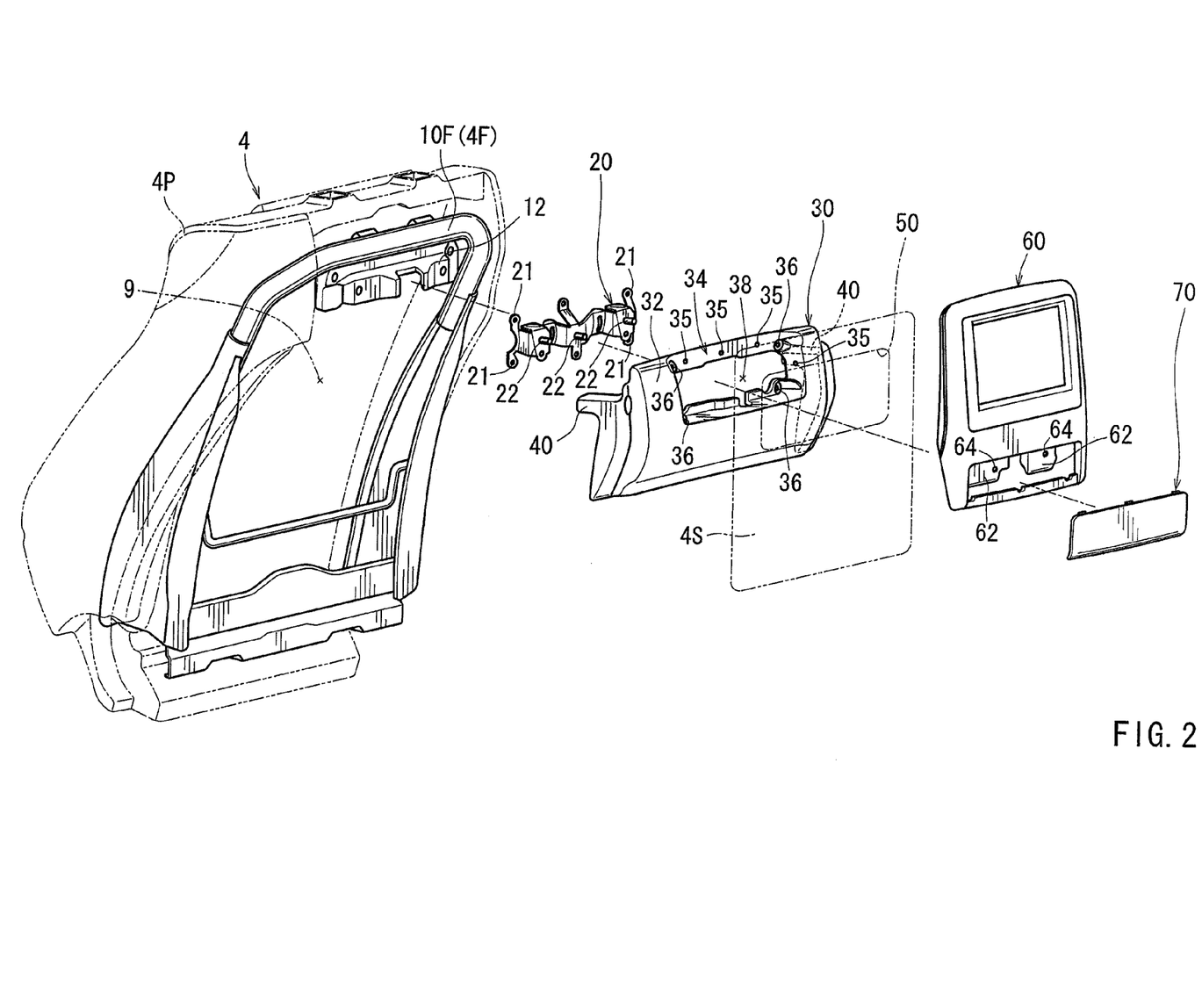
FIG. 2 is a disassembled perspective view showing a back side of a vehicle seat having an attaching structure.

In reference to FIGS. 1 and 2, the seat back 4 includes a back frame 4F, a pad member 4P, and a skin member 4S. At the back side of the seat back 4, the pad member 4P is notched substantially in an arch-like shape (when viewed from back) and notch portion 9 is provided. The back frame 4F is exposed to a seat back side of the notch portion 9.

The pad member 4P is covered by the skin member 4S and a back board 8 is arranged at a lower portion of the notch portion 9 (lower portion of back side of the seat back 4). Further, a monitor panel 60 is attached to an upper portion of the notch portion 9 (upper portion of back side of seat back 4).

According to the embodiment, in attaching the monitor panel 60, a frame member including a bezel 30 and a bracket 20 is arranged at the upper portion of the notch portion 9 by way of the bracket 20. Thereby, a structure of attaching the monitor panel 60 with an excellent outlook and stability is constituted.

(Bracket)

In reference to FIG. 2, the bracket 20 is a member made of a metal fixed to a pipe frame 10F (seat frame) constituting an upper portion of the back frame 4F. A shape of the bracket 20 is constituted by a recessed and projected shape (when viewed from above) in accordance with a shape of a base seat 12 provided at the pipe frame 10F. Further, both sides of the bracket 20 are provided with side pieces extended in an up and down direction of the seat. Upper and lower ends of the side piece are respectively provided with first screw holes 21 for fixing a bezel main body 32 by screws.

A stud bolt 22 for attaching the monitor panel 60 is positioned at a center of the bracket 20. According to the embodiment, 3 pieces of the stud bolt 22 are aligned to be projected at the center of the bracket 20. A projected length dimension Lex of the stud bolts 22 is set to a length capable of fixing the monitor panel 60 above the bezel 30 by a bolt (refer to FIG. 5).

(Frame Member (Bezel))

In reference to FIG. 2, the bezel 30 includes a bezel main body 32 and a pair of shoulder portions 40, 40.

The bezel main body 32 complements an upper portion of the notch portion 9 of the pad member 4P. Further, the bezel main body 32 constitutes a shape of a projected curve face in a vertical section in accordance with a shape of the pad member 4P arranged at the back side of the seat back 4 (refer to FIG. 5).

Figure 3A:
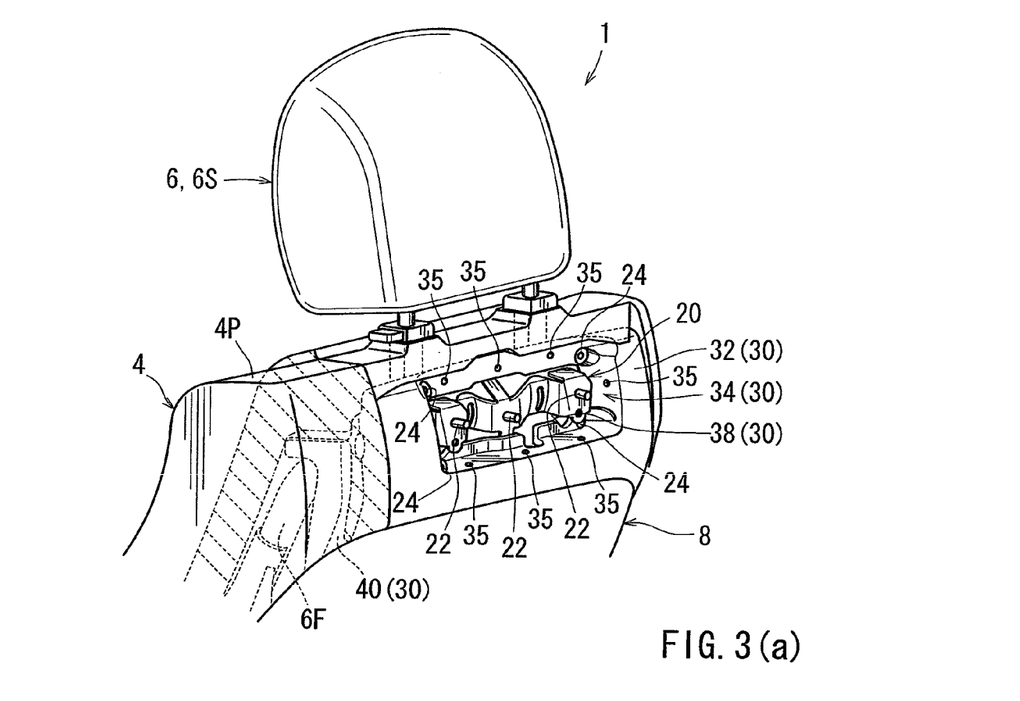
Figure 3B:
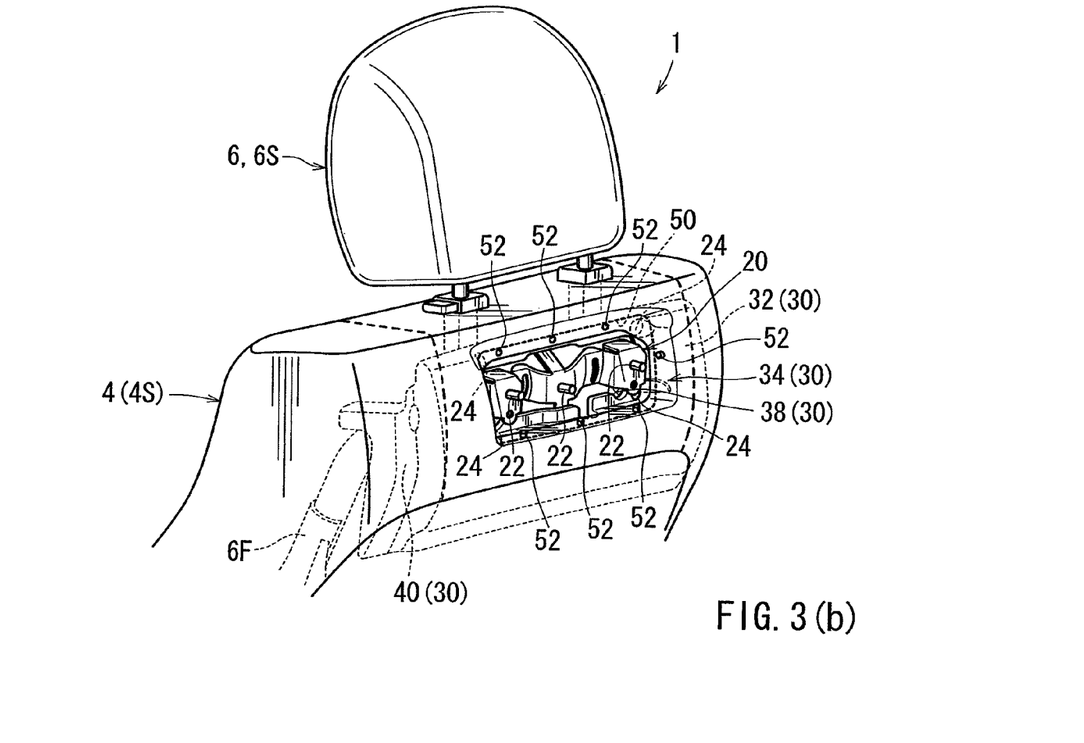

In reference to FIG. 3, the bezel main body 32 is arranged at the upper portion of the notch portion 9. Thereby, by the bezel main body 32, the pad members 4P (arch shape) arranged on both sides thereof, and the shape of the back side of the seat back 4 can be formed to be flush with each other.

The bezel main body 32 is provided with an attaching recess portion 34 for attaching the monitor panel 60.

The attaching recess portion 34 is a portion in a recess shape formed substantially at a center portion of the bezel main body 32. The attaching recess portion 34 can be formed to be deepened from an upper side over to a lower side of the bezel main body 32. Further, the attaching recess portion 34 is formed such that a width thereof is less narrower than that of the monitor panel 60 (top side of monitor arrangement). The inside of attaching recess portion 34 (inner peripheral wall) includes a plurality of clip holes 35 for fixing the skin member 4S by clips.

The attaching recess portion 34 is provided with a window portion 38 for exposing the bracket 20 to the back side of the seat back 4. Four corners (portions in correspondence with positions of arranging the first screw holes 21 of the bracket 20) of an inner wall of the attaching recess portion 34 are provided with second screw holes 36 for fixing the bracket 20. As described later, the bracket 20 is fitted to the attaching recess portion 34 and the bracket 20 is fixed to the attaching recess portion 34 by screws. Next, the bezel 30 is attached to the bracket 20.

Figure 5:
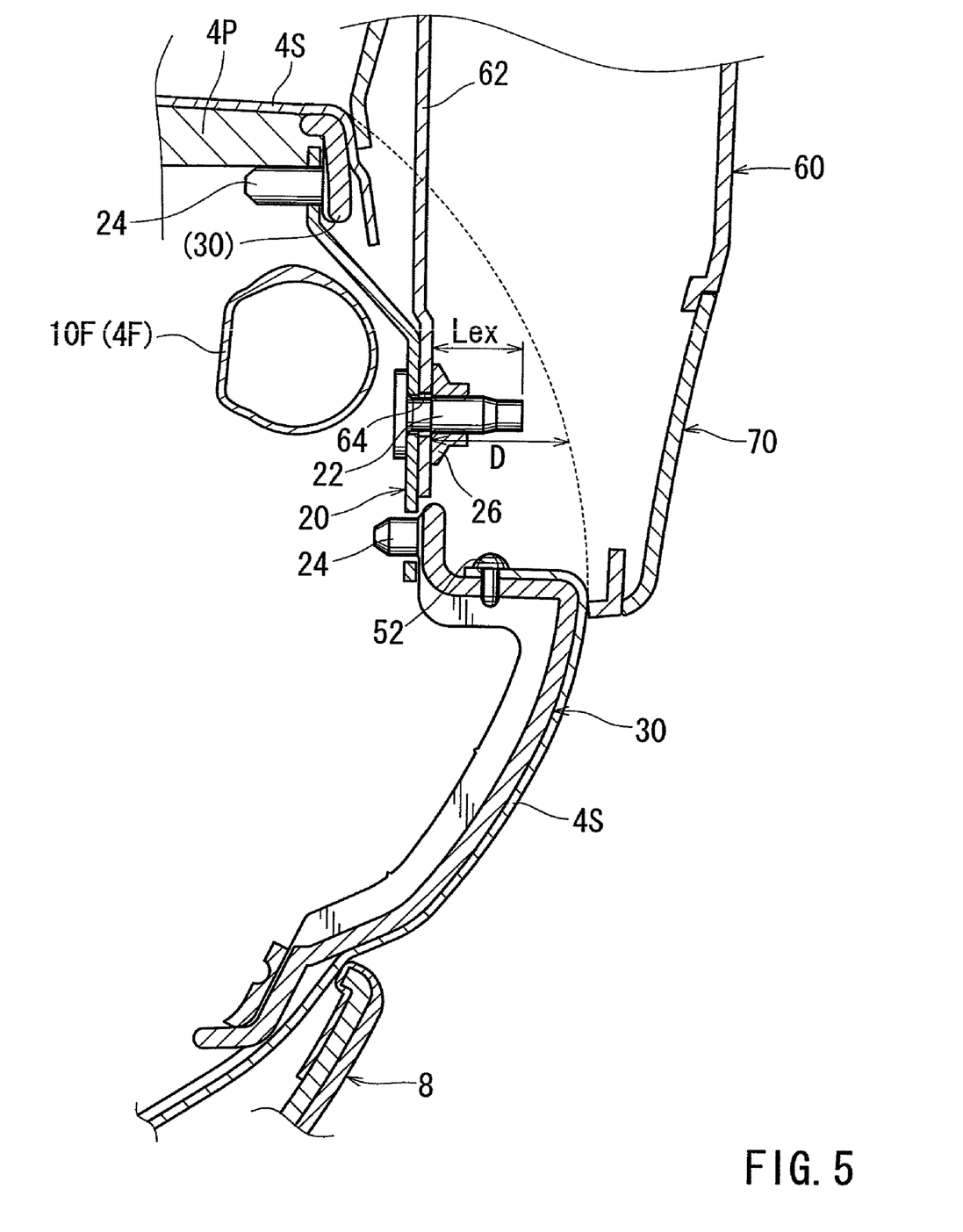
FIG. 5 is a sectional view taken along a line V-V of FIG. 1.

A depth dimension D (depth dimension at a vicinity of position of arranging the stud bolt 22) of the attaching recess portion 34 is set to be larger (deeper) than the projected length dimension Lex of the stud bolt 22 of the bracket 20 (refer to FIG. 5). Therefore, the bezel main body 32 is constructed so that the stud bolt 22 does not project from the attaching recess portion 34.

In reference to FIG. 2, the pair of shoulder portions 40, 40 are respectively provided on both sides of the bezel main body 32. The pair of shoulder portions 40, 40 are members that hold the pad member 4P in place, so that the pad member 4P does not shift to a lower side of the seat.

The pair of shoulder portions 40, 40 respectively constitute substantially an inverse L shape in a side view thereof. The respective shoulder portions 40 are provided to project to a front side of the seat more than the bezel main body 32. In reference to FIG. 3, the pair of shoulder portions 40, 40 (upper one face portions) hold in place the pad member 4P (constituting face contact state). Then, even when a passenger is seated on a top side of the seat and the pad member 4P is pulled, since the pad member 4P is brought into face contact with the shoulder portion 40 and is held there, it is difficult to shift the pad member 4P to a front direction of the seat.

The bezel 30 is formed of a material harder than the pad member 4P (typically, the pad member made of foamed resin of foamed urethane or the like), is difficult to be elastically deformed, and is typically a resin molded product.

As 'resin' constituting the bezel 30, 'thermoplastic resin' and 'thermosetting resin' can be exemplified. 'Thermoplastic resin' is polyethylene resin, polypropylene resin, nylon resin, polybutylene terephthalate resin, polycyclohexylene dimethylene terephthalate resin, polyoxylene resin, liquid crystal polyester resin, polyphenyl sulfide resin, polyetheretherketone resin or the like. 'Thermosetting resin' is epoxy resin, phenolic resin, melamine resin, urea resin, unsaturated polyester resin, alkyd resin, thermosetting polyimide resin or the like.

The bezel 30 can be made of a metal such as magnesium (typical material of seat frame), or made of polymer (elastomer) having rubber elasticity that is harder than the pad member 4P.

(Structure of Attaching Monitor Panel)

Figure 4:
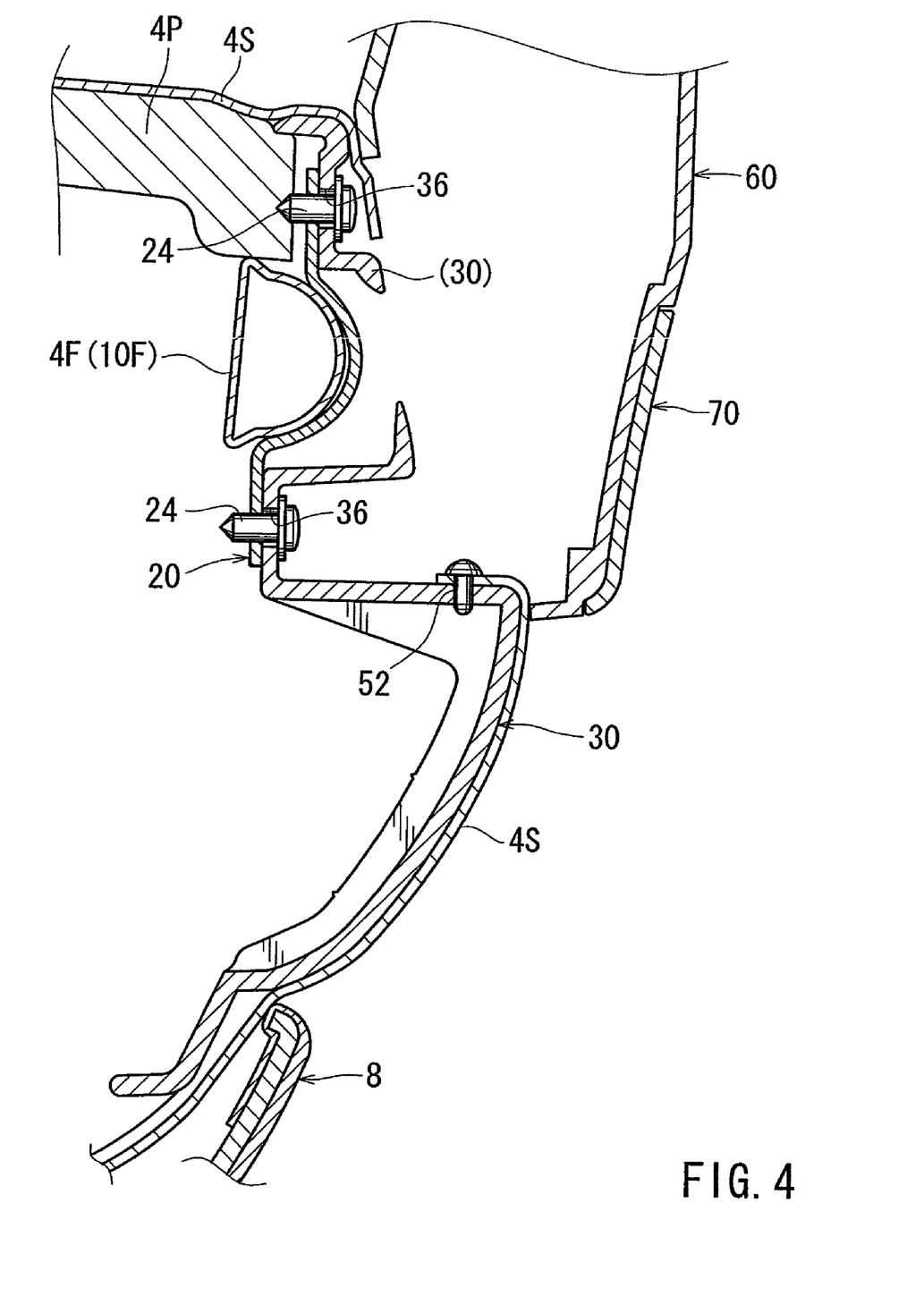
FIG. 4 is a sectional view taken along a line IV-IV of FIG. 1.

In reference to FIGS. 2 and 4, the bracket 20 is welded to be fixed to the pipe frame 10F as an arrangement of projecting the stud bolt 22 to the back side of the seat back 4.

In reference to FIG. 3, the bracket 20 is fitted to the window 38 of the bezel 30. By fixing the bracket 20 and the bezel 30 by the screw holes 21, 36 by screws (screw 24), the bezel 30 is positioned to be integrated to the bracket 20. Thereby, the bezel 30 can directly be fixed to the pipe frame 10F by way of the bracket 20 (without interposing the pad member 4P).

In reference to FIG. 3, the pad member 4P is held in place by the pair of shoulder portions 40, 40 (forming seat shape substantially in flush therewith). Next, a surface of the bezel main body 32 is covered by the skin member 4S.

In reference to FIG. 2, the skin member 4S is provided with an opening portion 50. The opening portion 50 is formed at an upper portion of the back side of the seat back 4 in accordance with a position of forming the attaching recess portion 34. An opening dimension of the opening portion 50 is smaller than (narrower than) a dimension of the attaching recess portion 34.

The skin member 4S covers the surface of the bezel main body 32 (and pad member 4P). Next, an edge portion of the opening portion 50 is folded in and fixed to the clip hole 35 of the inner peripheral wall of the attaching recess portion 34 by a clip (clip 52). By fixing the skin member 4S at the inside of the attaching recess portion 34, a portion of fixing the skin member 4S is concealed by the monitor panel 60. Therefore, the skin member 4S can be expanded to the bezel 30 and maintain an excellent appearance.

Further, the bezel 30 includes the stud bolt 22 that is not projected from the attaching recess portion 34 (as described above). Therefore, the skin member 4S can be covered at the bezel 30 without being hindered by the stud bolt 22 (without catching the skin member 4S by stud bolt 22) (refer to FIG. 5).

In reference to FIGS. 2 and 5, the stud bolt 22 (exposed from the attaching recess portion 34) is inserted to an attaching hole 64 provided at the monitor panel 60 (metal plate 62 inwardly provided on back side). The monitor panel 60 is attached from above the skin member 4S by fastening the stud bolt 22 by a nut 26. In particular, the metal plate 62 is provided with a width dimension capable of being contained within the attaching recess portion 34 of the bezel 30 and is inwardly provided at the back side of the monitor panel 60. While containing the metal plate 62 to inside of the attaching recess portion 34, the metal plate 62 is fastened by the stud bolt 22 (refer to FIG. 6).

A width of the top side of the monitor panel 60 is larger than that of the attaching recess portion 34 of the bezel 30. Therefore, by attaching the monitor panel 60, an edge of a top side of the monitor panel 60 is pressed on the surface of the bezel 30 surrounding the attaching recess portion 34. When the monitor panel 60 is pressed to the surface of the bezel 30, a thickness of the skin member 4S substantially becomes about a half thereof. Thereby, attaching faces of the monitor panel 60 and the skin member 4S are brought into a close contact state and the monitor panel 60 can be attached to the bezel 30 having an excellent appearance.

Further, by concealing the attaching hole of the monitor panel 60 by a cover member 70, attaching of the monitor panel 60 is finished.

According to the embodiment, in reference to FIG. 4 and FIG. 5, the skin member 4S is expanded to the bezel 30 (the frame member) more than the pad member 4P. Further, the monitor panel 60 is attached from above the skin member 4S. At this occasion, even when the monitor panel 60 is pressed to the skin member 4S that is expanded to the bezel 30, since the bezel 30 is harder than the pad member 4P, a state of expanding the skin member 4S is comparatively maintained and the skin member 4S is difficult to be wrinkled. Therefore, according to the attaching structure, the matching face of the monitor panel 60 and the bezel 30 (skin member 4S) is not wrinkled and the monitor panel 60 can be attached further stably and having an excellent appearance.

Further, at the back side of the seat back 4, the bezel 30 is directly connected to the pipe frame 10F by using the bracket 20 (without interposing pad member 4P). Therefore, the bezel 30 is prevented or reduced from being shaked relative to the seat back 4 and the monitor panel 60 can further stably be held by the bezel 30.

In reference to FIG. 1, seam lines SEW of two pieces of the skin members 4S are run on upper and lower sides of the seat near the two shoulder portions 40 at the back side of the seat back 4. A width dimension W of the bezel 30 is set to a dimension the same as a width of separating 2 pieces of the seam lines SEW.

Figure 6:
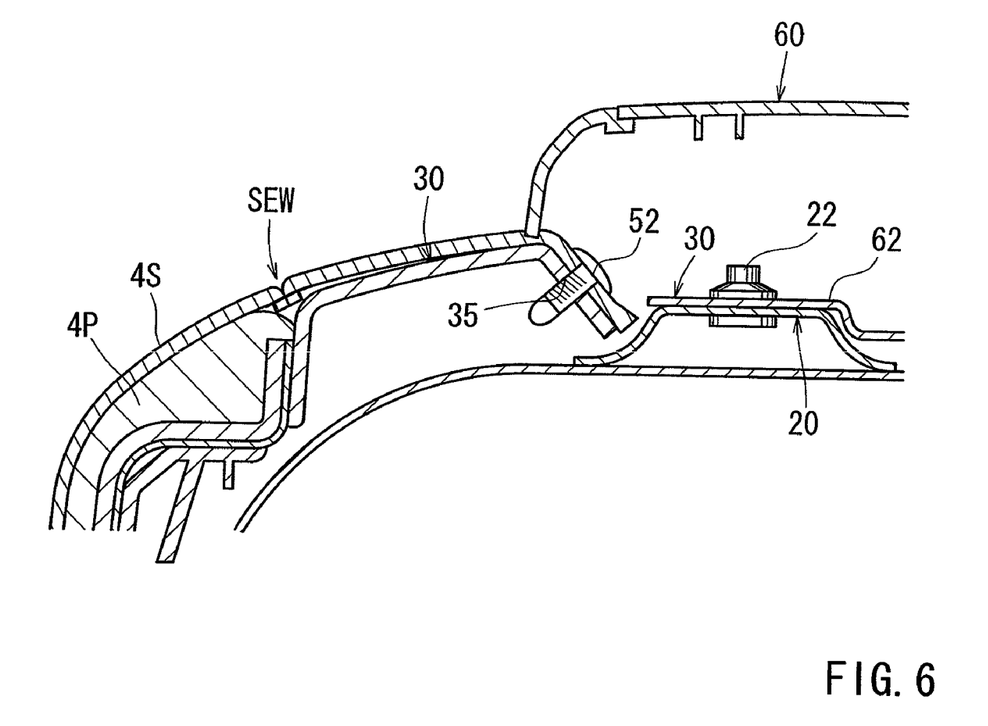
FIG. 6 is a sectional view taken along a line VI-VI of FIG. 1.

With this configuration, in reference to FIG. 6, a boundary line of the bezel main body 32 and the pad member 4P overlaps the seam line SEW. Therefore, even when a stepped difference is present between the bezel main body 32 and the pad member 4P, the stepped difference is made to be inconspicuous by the seam line SEW on the surface of the skin member 4S. Therefore, the attaching structure of the embodiment can preferably be used in the vehicle seat 1 using the skin member 4S having the seam line SEW (skin member 4S constituted by seaming a plurality of the skin member pieces).

Alternative Embodiments

The attaching structure of the embodiment is not limited to the previously described embodiment, and therefore it is possible to adopt various other embodiments.

(1) As described above, the bezel 30 is directly attached to the back frame 4F by way of the bracket 20 that is made of a metal. It is acceptable that, bezel made of a metal can directly be fixed to the back frame 4F by welding or the like (without interposing bracket 20). In this case, a stud bolt is formed directly on the bezel.

(2) As described above, the skin member 4S and the bracket 20 are attached to the bezel 30 by means of screw fastening, clip fastening or the like. The skin member 4S of the bracket 20 can be attached to the bezel 30 by selecting various attaching means such as bolt fastening, or the like. The bezel 30 is provided with a harness (attaching strength), and therefore, other constituent element can firmly be attached thereto by any physical attaching means. Further, various adhering means such as an adhering agent, melting or the like can also be used.

(3) As described above, the upper portion of the notch portion 9 of the pad member 4P is complemented by the bezel 30. It is acceptable that the seat shape of the back side of the seat back 4 can also be constituted by a single member of the bezel 30 without arranging the pad member 4P. In this case, it is not necessary to provide the shoulder portion 40 to the bezel 30, and therefore, the attaching structure becomes simpler.

(4) As described above, the monitor panel 60 is attached to the back side of the seat back 4. The attaching structure of the embodiment is applicable to respective constituent elements of the vehicle seat 1. For example, the monitor panel 60 can also be attached to the back side of the headrest 6 by the attaching structure. Further, the monitor panel can be attached not only to the upper portion of the back side of the seat back but also a lower portion of the back side or a side portion of the back side by applying the attaching structure. In such a case, the outer shape structure of the bracket or the bezel can be changed in accordance with shapes of respective constituent elements of the vehicle seat.

This invention claims:

1. An attaching structure for a monitor panel comprising:
a frame member which attaches the monitor panel at a back side of a vehicle seat including a seat cushion, a seat back and a headrest,
a skin member covering the vehicle seat, and
a pad member having a seat outer shape, wherein
the frame member is harder than the pad member,
the frame member is arranged at the back side of the seat back in place of the pad member and covered by the skin member, and
the monitor panel is attached to the frame member through the skin member.

2. The attaching structure for a monitor panel comprising according to claim 1, wherein
the frame member is directly fixed to a seat back frame of the vehicle seat without interposing the pad member.

3. A vehicle seat having an attaching structure for a monitor panel comprising:
a seat frame including a seat cushion frame, a seat back frame and a headrest;
a pad member positioned proximate the seat back frame;
a skin member positioned over the pad member;
a frame member connected to a top portion of the seat back frame, wherein the frame member is harder than the pad member; and
a monitor attached to the frame member through the skin member, wherein the frame member is directly connected to the seat back frame.

4. The vehicle seat of claim 3, wherein the frame member includes a bezel and a bracket, further wherein the bracket is connected to the seat back frame and the bezel is connected to the bracket.

5. The vehicle seat of claim 4, wherein the bracket includes a plurality of bolts that extend into the bezel.

6. The vehicle seat of claim 5, wherein the bezel includes a recessed portion and the plurality of bolts do not extend out of the recessed portion.

7. The vehicle seat of claim 6, wherein the monitor fits into the recessed portion.

8. The vehicle seat of claim 7, wherein the plurality of bolts extend through a plurality of holes on the monitor.

9. The vehicle seat of claim 1, wherein the frame member is made of at least one of magnesium or polymer.

10. The vehicle seat of claim 3, wherein the skin member is connected to the frame member by a clip.

11. A vehicle seat having an attaching structure for a monitor panel comprising:
a seat frame;
a pad member positioned proximate the seat frame;
a skin member positioned over the pad member;
a frame member connected to a top portion of the seat frame, wherein the frame member is harder than the pad member; and a monitor attached to the frame member through the skin member, wherein the frame member is directly connected to the seat frame, wherein the frame member includes a bezel and a bracket, wherein the bracket is connected to the seat frame and the bezel is connected to the bracket, wherein the bracket includes a plurality of bolts that extend into the bezel, and wherein the bezel includes a recessed portion and the plurality of bolts do not extend out of the recessed portion.

12. The vehicle seat of claim 11, wherein the monitor fits into the recessed portion.

13. The vehicle seat of claim 12, wherein the plurality of bolts extend through a plurality of holes on the monitor.

* * * * *